United States Patent
Kanazawa et al.

(10) Patent No.: US 7,239,931 B2
(45) Date of Patent: Jul. 3, 2007

(54) SHEET METAL FACTORY PROCESSING SYSTEM

(75) Inventors: Masato Kanazawa, Kanagawa (JP); Kaoru Nakamura, Kanagawa (JP)

(73) Assignee: Amada Company, Limited, Kanagawa (JP)

(*) Notice: Subject to any disclaimer, the term of this patent is extended or adjusted under 35 U.S.C. 154(b) by 0 days.

(21) Appl. No.: 10/985,050

(22) Filed: Nov. 10, 2004

(65) Prior Publication Data
US 2005/0107903 A1    May 19, 2005

Related U.S. Application Data

(60) Provisional application No. 60/519,272, filed on Nov. 13, 2003.

(51) Int. Cl.
*G06F 19/00* (2006.01)
(52) U.S. Cl. .................. 700/100; 700/99; 700/101; 700/105; 700/117
(58) Field of Classification Search .................. 700/95, 700/97, 98, 100, 103, 105, 117, 182, 99, 127, 700/101, 102
See application file for complete search history.

(56) References Cited

U.S. PATENT DOCUMENTS 6,185,476 B1 *  2/2001  Sakai ..................... 700/182
6,233,538 B1 *  5/2001  Gupta et al. ............. 703/6

FOREIGN PATENT DOCUMENTS

| JP | 7-56619 | 3/1995 |
|----|---------|--------|
| JP | 11-10491 | 1/1999 |
| JP | 2002-73137 | 3/2002 |

OTHER PUBLICATIONS

English language Abstract of JP11-10491.
English language Abstract of JP 2002-73137.
English language Abstract of JP 7-56619.

* cited by examiner

*Primary Examiner*—Leo Picard
*Assistant Examiner*—Charles Kasenge
(74) *Attorney, Agent, or Firm*—Greenblum & Bernstein, P.L.C.

(57) ABSTRACT

A sheet metal factory processing system includes a production management apparatus which generates a processing schedule based on a manufacturing designation. The processing schedule is managed in each unit of material sheets. The sheet metal factory processing system also includes a sheet metal factory processing installation which is mutually connected to the production management apparatus through a communication network to execute the processing schedule received from the production management apparatus.

8 Claims, 14 Drawing Sheets

BLANK PRODUCTION DESIGNATION

| PART | THE NUMBER OF SHEETS | DUE DATE | PROCESSING MACHINE |
|------|----------------------|----------|--------------------|
| P1 | 5 | 9-20 | LASER |
| P2 | 6 | 9-20 | LASER |
| P3 | 2 | 9-20 | LASER |
| P4 | 1 | 9-20 | LASER |
| | | | |

FIG.4A

PROCESSING SCHEDULE (BLANK LAYOUT RESULT)

| SHEET | THE NUMBER OF SHEETS | DUE DATE | PROCESSING MACHINE | RESERVING STATUS |
|---|---|---|---|---|
| S1 | 3 | 9-20 | #1 LASER | |
| S2 | 2 | 9-20 | #1 LASER | |
| | | | | |

FIG.4B

PROCESSING SCHEDULE (EVERY MATERIAL SHEET)

| SHEET | THE NUMBER OF SHEETS | DUE DATE | PROCESSING MACHINE | RESERVING STATUS |
|---|---|---|---|---|
| S1-1 | 1 | 9-20 | #1 LASER | (UNATTACKED) |
| S1-2 | 1 | 9-20 | #1 LASER | (UNATTACKED) |
| S1-3 | 1 | 9-20 | #1 LASER | (UNATTACKED) |
| S2-1 | 1 | 9-20 | #1 LASER | (UNATTACKED) |
| S2-2 | 1 | 9-20 | #1 LASER | (UNATTACKED) |
| | | | | |

FIG.5

PROCESSING SCHEDULE (RESERVED ACTUAL RESULTS)

| SHEET | THE NUMBER OF SHEETS | DUE DATE | PROCESSING MACHINE | RESERVING STATUS |
|---|---|---|---|---|
| S1-1 | 1 | 9-20 | #1 LASER | ONE SHEET OF #1 LASER |
| S1-2 | 1 | 9-20 | #1 LASER | ONE SHEET OF #1 LASER |
| S1-3 | 1 | 9-20 | #1 LASER | UNATTACKED |
| S2-1 | 1 | 9-20 | #1 LASER | UNATTACKED |
| S2-2 | 1 | 9-20 | #1 LASER | UNATTACKED |
|  |  |  |  |  |

FIG.6

BLANK PRODUCTION DESIGNATION

| PART | THE NUMBER OF SHEETS | DUE DATE | PROCESSING MACHINE |   |
|---|---|---|---|---|
| P1 | 5 | 9-20 | LASER |   |
| P2 | 6 | 9-20 | LASER |   |
| P3 | 2 | 9-20 | LASER |   |
| P4 | 1 | 9-20 | LASER |   |
| P5 | 4 | 9-20 | LASER | ⇐ ADDITION |
|  |  |  |  |   |

FIG.7A

PROCESSING SCHEDULE (BLANK LAYOUT RESULT)

| SHEET | THE NUMBER OF SHEETS | DUE DATE | PROCESSING MACHINE | RESERVING STATUS |
|---|---|---|---|---|
| S3 | 2 | 9-20 | #1 LASER | |
| S4 | 2 | 9-20 | #1 LASER | |
| S5 | 1 | 9-20 | #1 LASER | |
| | | | | |

FIG.7B

PROCESSING SCHEDULE
(EVERY MATERIAL SHEET/RESERVED ACTUAL ACHIEVEMENT)

| SHEET | THE NUMBER OF SHEETS | DUE DATE | PROCESSING MACHINE | RESERVING STATUS |
|---|---|---|---|---|
| S1-1 | 1 | 9-20 | #1 LASER | ONE SHEET OF #1 LASER |
| S1-2 | 1 | 9-20 | #1 LASER | ONE SHEET OF #1 LASER |
| S3-1 | 1 | 9-20 | #1 LASER | ONE SHEET OF #1 LASER |
| S3-2 | 1 | 9-20 | #1 LASER | UNATTACKED |
| S4-1 | 1 | 9-20 | #1 LASER | UNATTACKED |
| S4-2 | 1 | 9-20 | #1 LASER | UNATTACKED |
| S5-1 | 1 | 9-20 | #1 LASER | UNATTACKED |
| | | | | |

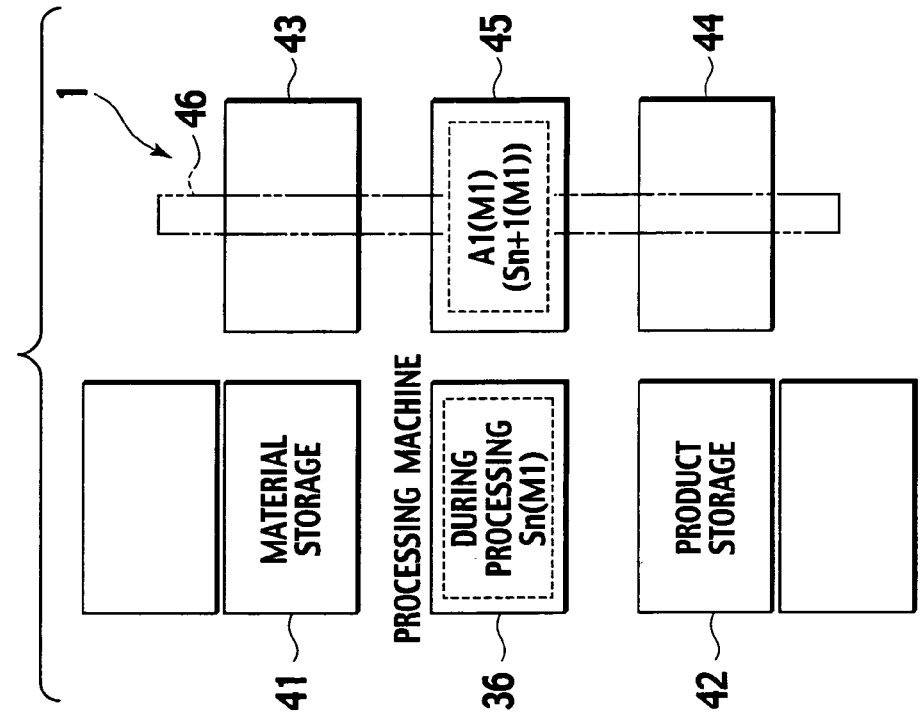
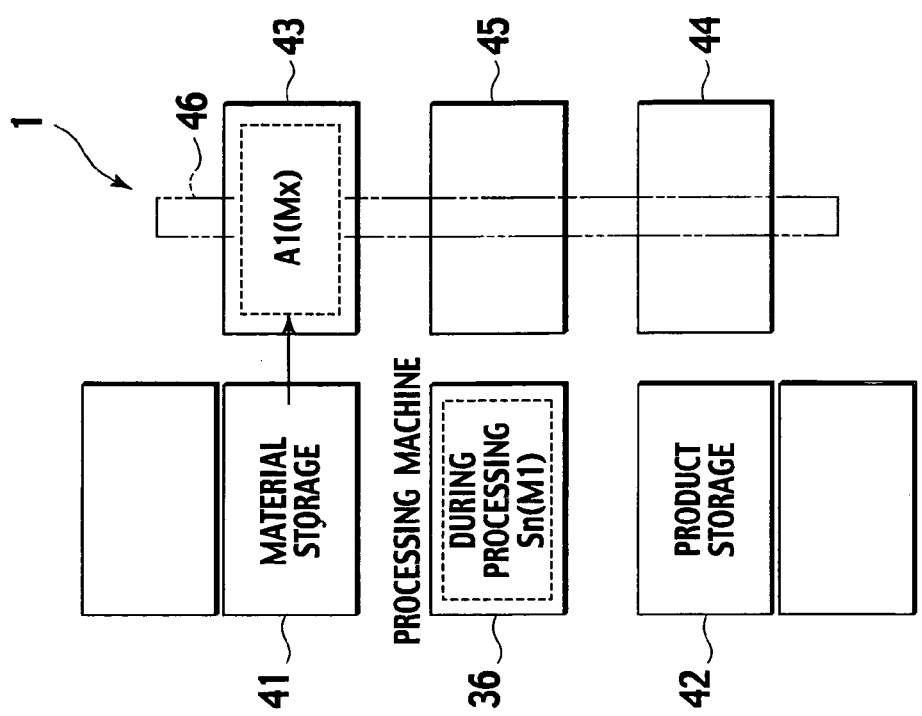

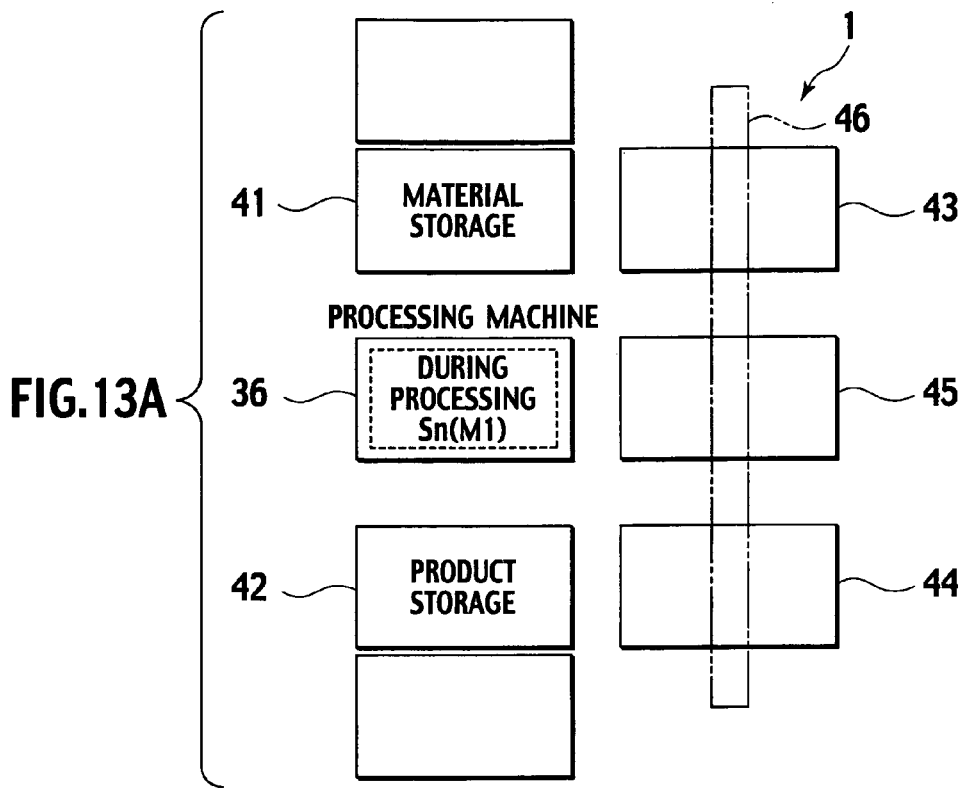
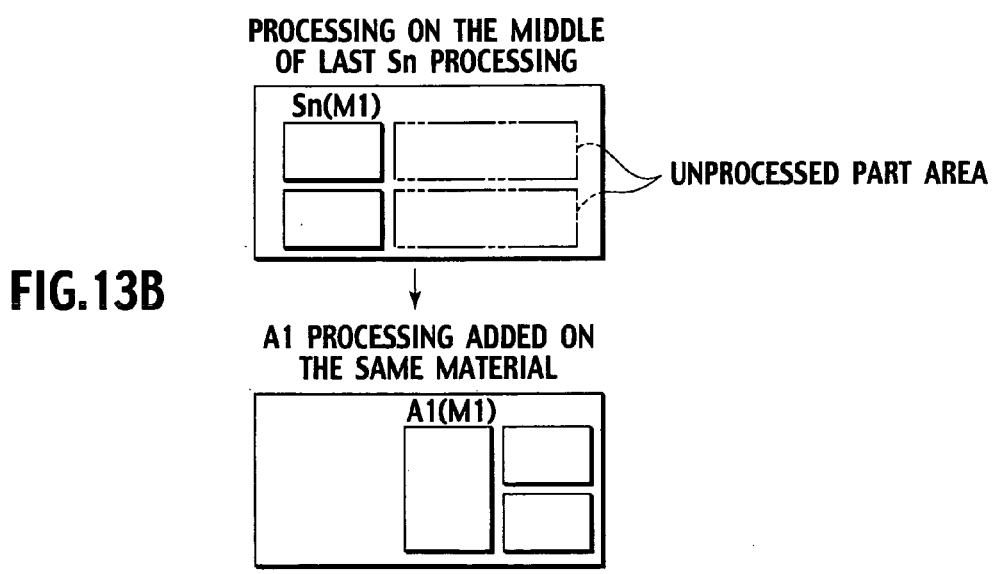

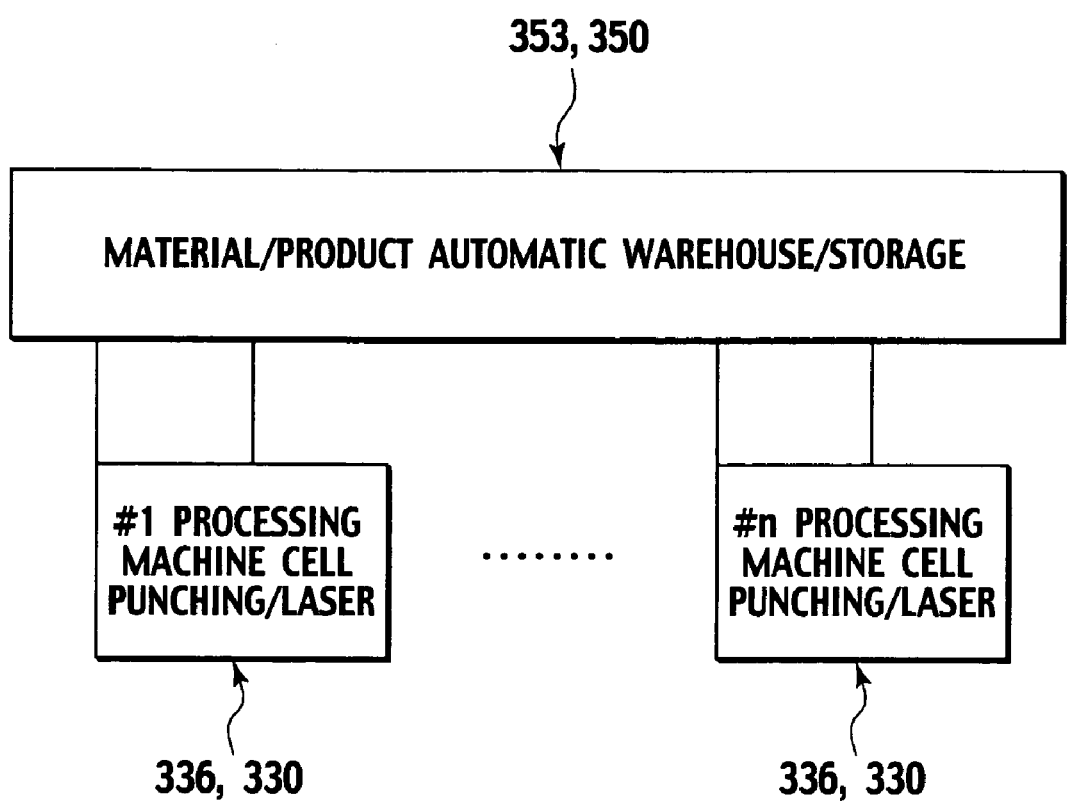

SHEET METAL FACTORY PROCESSING SYSTEM

CROSS-REFERENCE TO RELATED APPLICATIONS

This application claims the benefit of U.S. Provisional Application No. 60/519,272, filed Nov. 13, 2003.

TECHNICAL FIELD

The present invention relates to a sheet metal factory processing system for nesting parts data into a material sheet and processing the same using a processing machine.

BACKGROUND ART

In a conventional sheet metal factory processing system comprising a production management apparatus and a sheet metal factory processing installation, the production management apparatus produces a production designation, and the sheet metal factory processing installation put a processing schedule into effect based on the production designation.

In some of the conventional sheet metal factory processing systems of this kind, when the production management apparatus produces the production designation, the production management apparatus also produces a processing schedule including the nesting processing of the parts data and CAM processing, the production designation including the processing schedule is transferred from the production management apparatus to the sheet metal factory processing installation, and the sheet metal factory processing installation put a schedule into effect in accordance with the production designation and in accordance with an executable processing schedule.

In some of the conventional sheet metal factory processing systems of this kind, the production management apparatus only produces the production designation, the production designation is transferred from the production management apparatus to the sheet metal factory processing installation, the sheet metal factory processing installation produce the processing schedule including the nesting processing of the parts data and CAM processing, and the sheet metal factory processing installation put a schedule in accordance with the processing schedule (for example, see Patent Literature 1).

[Patent Literature 1] Japanese Patent Application Laid-open No. H11-10491 Publication

DISCLOSURE OF THE INVENTION

Problem to be Solved by the Invention

However, any of the conventional sheet metal factory processing systems have various problems.

That is, in the case of the sheet metal factory processing system which also produces the processing schedule by means of the production management apparatus, after the production designation including the processing schedule is once transferred from the production management apparatus to the sheet metal factory processing installation, the sheet metal factory processing installation only puts the processing schedule in accordance with the production designation.

Therefore, when the sheet metal factory processing installation puts the schedule in accordance with the production designation, if it becomes necessary to add something to the production designation or change the production designation by the production management apparatus, even if the production management apparatus tries to change the processing schedule based on the change of the production designation, the progress of the schedule that is being executed by the sheet metal factory processing installation is unclear. Thus, it is difficult to change the processing schedule including correction of the processing schedule which has already been transferred to the sheet metal factory processing installation.

Thus, there is a problem that it is difficult to smoothly operate the sheet metal factory processing installation in accordance with a production designation that the production management apparatus desires. Since the sheet metal factory processing installation are not operated smoothly in accordance with the production designation, there is a problem that it is difficult to reduce unnecessary waiting time, and to improve the availability ratio and productivity of the sheet metal factory processing installation.

In the case of the sheet metal factory processing system in which a sheet metal factory processing installation produces a processing schedule by using a controller, it is inevitable that data processing ability of the controller is inferior to that of the production management apparatus.

Thus, when high volumes of data processing is necessary to produce a processing schedule including the nesting processing of parts data and CAM processing with respect to a production designation transferred from the production management apparatus like a case where different amounts of and different kinds of products are to be produced, or when necessary data processing must frequently be carried out with respect to production designations which are transferred from the production management apparatus one after another like a case where the same amount of and one kind of products are to be produced, it is difficult to handle such cases.

Therefore, there is a problem that it is difficult to operate the sheet metal factory processing installation smoothly in accordance with the production designation that the production management apparatus desires. There is also a problem that since the sheet metal factory processing installation are not operated smoothly in accordance with the production designation, it is difficult to reduce unnecessary waiting time, and it is difficult to improve the availability ratio and productivity of the sheet metal factory processing installation.

It is an object of the present invention to provide a sheet metal factory processing system in which the conventional problems can be solved, the sheet metal factory processing installation can be operated in accordance with a production designation that the production management apparatus desires, and the availability ratio and productivity of the sheet metal factory processing installation can be improved.

MEANS FOR SOLVING THE PROBLEMS

The present invention has been achieved to solve the above problems, in a sheet metal factory processing system, a production management apparatus and sheet metal factory processing installation are combined with each other such that they can carry out communications therebetween, the sheet metal factory processing installation put a processing schedule into effect based on a production designation, and the production management apparatus controls the processing schedule based on the production designation for each of the material sheets.

According to the invention, in the sheet metal factory processing system, a job controller of the production management apparatus and a controller of the sheet metal factory processing installation are connected to a network, the sheet metal factory processing installation put the processing schedule into effect based on the production designation produced by the production management apparatus, and in reply to a processing schedule request from the controller of the sheet metal factory processing installation to the job controller, the production management apparatus sends a processing schedule for one material sheet based on the production designation to the controller.

EFFECT OF THE INVENTION

In a sheet metal factory processing system according to the invention, a production management apparatus and sheet metal factory processing installation are combined with each other such that they can carry out communications therebetween, the sheet metal factory processing installation put a processing schedule into effect based on a production designation, and the production management apparatus controls the processing schedule based on the production designation for each of the material sheets. There is effect that it is possible to smoothly control the sheet metal factory processing installation in accordance with the production designation desired by the production management apparatus, and the availability ratio of the sheet metal factory processing installation can be improved.

BEST MODE FOR CARRYING OUT THE INVENTION

Embodiments of the present invention are explained below with reference to the accompanying drawings.

FIG. 1 is a schematic block diagram showing a first embodiment of a sheet metal factory processing system according to the present invention. This sheet metal factory processing system 1 comprises a production management apparatus 10 and sheet metal factory processing installation 30 which are combined with each other such that communications can be carried out therebetween. The sheet metal factory processing installation 30 puts a processing schedule into effect based on a production designation produced by the production management apparatus 10.

The production management apparatus 10 includes a production management unit 11, a process scheduler (progress management) 12, a dynamic nesting & CAM processing unit 13 and a job controller 14. The production management apparatus 10 is connected to a network 20.

The production management unit 11 carries out various processing required for production control. The production management unit 11 produces a necessary production designation based on the production control and controls the production designation.

The process scheduler (progress management) 12 produces a processing schedule executed by the sheet metal factory processing installation 30 based on the production designation produced by the production management unit 11. The process scheduler (progress management) 12 controls the processing schedule.

When the process scheduler (progress management) 12 produces the processing schedule, the dynamic nesting & CAM processing unit 13 carries out a blank layout processing for nesting parts data in a material sheet, and CAM processing for producing processing data of the material sheet.

The job controller 14 sends and receives various data to and from a controller 31 of the sheet metal factory processing installation 30 through the network 20, and sends and receives necessary various data to and from various portions of the production management apparatus 10.

The sheet metal factory processing installation 30 comprises a controller 31, a CNC apparatus 35, a processing machine 36, a line control box 37 and a peripheral device 40. The controller 31 of the sheet metal factory processing installation 30 is connected to the network 20.

The controller 31 sends and receives various data to and from the job controller 14 of the production management apparatus 10 through the network 20, and sends and receives necessary various data to and from various portions of the sheet metal factory processing installation 30.

The controller 31 includes a schedule request (dynamic nesting processing request) unit 32 for requesting and receiving a processing schedule from the job controller 14 of the production management apparatus 10, a cell control operation/DNC transfer unit 33 and a inventory management (storage & periphery control) unit 34.

The CNC apparatus 35 prepares NC data which can be executed while taking into consideration the processing condition and tooling information based on the processing schedule received by the controller 31 from the job controller 14 in replay to the schedule request.

The processing machine 36 is a punching (punch press), a laser (laser processing machine) or the like. The processing machine 36 carries out necessary sheet metal processing (sheet processing) in cooperation with the peripheral device 40.

The line control box 37 operates the peripheral device 40 in cooperation with the processing machine 36 when the processing machine 36 carries out necessary sheet metal processing (sheet processing) based on the processing schedule received by the controller 31 from the job controller 14 in accordance with the schedule request.

FIG. 2 is a schematic block diagram showing a layout example of the peripheral device 40. The peripheral device 40 includes storages such as a material storage 41 and a product storage 42 disposed on both sides of the processing machine 36, standby spaces such as a loading buffer 43 and an unloading buffer 44 disposed adjacent to the shelves, a loading/unloading shuttle 45 disposed adjacent to the processing machine 36, and a single-sheet pickup and conveying device 46.

Only a moving range of the single-sheet pickup and conveying device 46 is schematically illustrated in FIG. 2. A carrier having a large number of vacuum pads which cover a plane corresponding to a size of a material sheet is supported such that the carrier can run along a raid disposed above the carrier. The height of the vacuum pads can be adjusted in height.

Therefore, the peripheral device 40 can carry out various motions for handling the material sheet in FIG. 2.

That is, the single-sheet pickup and conveying device 46 can take and transfer one material sheet from the material storage 41 and place the same on the loading buffer 43.

The single-sheet pickup and conveying device 46 can take and transfer one material sheet from loading buffer 43 and place the same on the loading/unloading shuttle 45.

The loading/unloading shuttle 45 can load the material sheet on the processing machine 36.

The loading/unloading shuttle 45 can unload a processed sheet (product) from the processing machine 36.

The single-sheet pickup and conveying device 46 can take one processed sheet (product) from the loading/unloading shuttle 45 and place (assort and collect) the same on the unloading buffer 44.

The single-sheet pickup and conveying device 46 can take and transfer one processed sheet (product) from the unloading buffer 44 and can assert and accommodate the same in the product storage 42.

The dynamic nesting & CAM processing unit 13 of the production management apparatus 10 of the sheet metal factory processing system 1 includes a processing time simulation function for calculating time required between the instant when the processing machine 36 is loaded with one material sheet and the processing of the material sheet is started and the instant when the processing is completed.

The actual time concerning a taking-out operation of past material sheet elapsed until the past material sheet was transferred from the material storage 41 to the loading/unloading shuttle 45 through the loading buffer 43 is stored in the production management apparatus 10.

The controller 31 of the sheet metal factory processing installation 30 is arranged such that if one material sheet is transferred from the loading buffer 43 to the loading/unloading shuttle 45 and the loading buffer 43 becomes empty, the controller 31 generates a next schedule request.

If the controller 31 requests a schedule to the job controller 14, the production management apparatus 10 transfers a processing schedule of next one material sheet to the sheet metal factory processing installation 30 at a timing for synchronizing the processing completion time slot and an entering preparation completion time slot so that the entering preparation of the next material sheet to the processing machine 36 is completed at a slot time when the processing of the material sheet that is to be processed by the processing machine 36 is completed.

That is, the production management apparatus 10 transfers the processing schedule of next one material sheet to the sheet metal factory processing installation 30 at time (before m minutes of the processing completion slot time) obtained by inversely calculating time required for bringing out the next material sheet estimated while referring to the past record from the processing completion slot time calculated by the processing time simulation function for the material sheet which is being processed.

Next, the operation of the embodiment will be explained using Tables shown in FIGS. 3 to 7.

First, the production management unit 11 of the production management apparatus 10 produces a necessary production designation based on the production control. The contents of the production designation are "five parts P1, six parts P2, two parts P3 and one parts P4 should be prepared by the laser processing machine until the due date of September 20", for example. This is indicated by the Table shown in FIG. 3.

Based on this production designation, the process scheduler (progress management) 12 obtains the blank layout processing and the CAM processing by the dynamic nesting & CAM processing unit 13, and produces a processing schedule.

That is, as shown in FIG. 4A, kinds of material sheets to be used (material, thickness, size and the like), the necessary number of material sheets, and a processing machine to be used (e.g., #1 laser) are determined, thereby determining the processing schedule.

Then, as shown in FIG. 4B, the determined processing schedules are divided to each of the material sheets, and a processing schedule for each material sheet based on the production designation is completed.

First, if a processing schedule of a first material sheet S1-1 is sent to the controller 31 from the job controller 14, the controller 31 of the sheet metal factory processing installation 30 reserves the #1 laser processing machine 36 in accordance with the processing schedule, and allows the #1 laser processing machine 36 to carry out the processing of the material sheet S1-1 in cooperation with the peripheral device 40.

If the first material sheet S1-1 is brought out from the material storage 41 and sent to the loading/unloading shuttle 45 through the loading buffer 43 and the loading buffer 43 is emptied, the controller 31 immediately send a next schedule request to the job controller 14.

Upon reception of the schedule request, the production management apparatus 10 sends a processing schedule of a second material sheet S1-2 to the controller 31 from the job controller 14 at timing at which processing completion slot time of the first material sheet S1-1 and entering preparation completion slot time of the second material sheet S1-2 are synchronized.

Upon reception thereof, the controller 31 of the sheet metal factory processing installation 30 reserves the #1 laser processing machine 36 in accordance with the processing schedule, and allows the #1 laser processing machine 36 to carry out the processing of the second material sheet S1-2 in cooperation with the peripheral device 40.

A state of the processing schedule controlled by the process scheduler (progress management) 12 is shown in FIG. 5. That is, the first and second material sheets S1-1 and S1-2 are reserved, and the third S1-3 and subsequent material sheets are not processed.

In this state, when the production management unit 11 changes (including addition) the current production designation based on the production control, i.e., when a production designation that "four parts P5 should be prepared by a laser processing machine until the due date of September 20" is added for example, as shown in FIG. 6, a new production designation for the parts P5 is added to the current production designation for the parts P1 to P4, and a production designation is newly produced.

Based on this newly produced production designation, the process scheduler (progress management) 12 obtains the blank layout processing and CAM processing by the dynamic nesting & CAM processing unit 13 based on the progress of the current processing schedule, and newly produces a processing schedule.

That is, in reply to the added production designation that "four parts P5 should be prepared by a laser processing machine until the due date of September 20" shown in FIG. 6, kinds of material sheet to be used, the necessary number of material sheets and a processing machine are determined, this and not-yet done processing schedules shown in FIG. 5 are combined, thereby determining processing schedule shown in FIG. 7A, which are required currently and subsequently of the newly produced production designation.

Next, as shown in FIG. 7B, the determined processing schedules are divided for each of the material sheets below the table of the material sheets S1-1 and S1-2 which have currently been reserved, and a processing schedule for each of necessary material sheet currently and subsequently is completed based on the newly produced production designation.

If the job controller 14 receives a next schedule request from the controller 31, the production management apparatus 10 sends the processing schedule of the third material sheet S3-1 to the controller 31 from the job controller 14 at timing at which the processing completion slot time of the second material sheet S1-2 and the entering preparation completion slot time of the third material sheet S3-1 are synchronized.

Upon reception thereof, the controller 31 of the sheet metal factory processing installation 30 reserves the #1 laser processing machine 36 in accordance with the processing schedule, allows the #1 laser processing machine 36 to carry out the processing of the third material sheet S3-1 in cooperation with the peripheral device 40.

If the processing of the last sheet metal S5-1 is completed in the same manner, this means that all of necessary sheet metal processing (sheet processing) based on the current production designation (including addition) has been completed.

As described above, in the sheet metal factory processing system 1, the process scheduler (progress management) 12 of the production management apparatus 10 controls the processing schedule based on the production designation for each of the material sheets. Even if the production management apparatus 10 receives a next schedule request from the controller 31 of the sheet metal factory processing installation 30, the schedule request is not met unconditionally. That is, the system waits for timing (before m minutes of the processing completion slot time) at which processing completion slot time of preceding material sheet and entering preparation completion slot time of next material sheet are synchronized, and the processing schedule of the next material sheet is sent to the controller 31.

Thus, the sheet metal factory processing system 1 can handle interruption processing schedule generated at various timings and under various conditions. The interrupt functions will be explained using schematic layout block diagrams shown in FIGS. 8 to 13.

FIG. 8 shows a first example of an interrupt function of the sheet metal factory processing system 1. This example shows that when an interrupt processing schedule is generated during processing of n-th material sheet Sn (material & thickness M1), if this generation timing is before m minutes of the processing completion slot time of the material sheet Sn, any interrupt processing schedule A1 can be carried out (interrupted) irrespective of material•thickness Mx.

With this arrangement, an automatic operation can be continued without stopping the sheet metal factory processing installation 30 including the processing machine 36.

FIG. 9 shows a second example of the interrupt function of the sheet metal factory processing system 1. This example shows that when the interrupt processing schedule is generated within m minutes of the processing completion slot time of the n-th material sheet Sn (material & thickness M1), the material sheet A1 to be used in the interrupt processing schedule is the same material•thickness M1 as that of the n+1-th material sheet Sn+1(material & thickness M1).

In this case, the interrupt processing schedule of the material sheet A1 is dynamically nested in the material sheet Sn+1, and the interrupt processing schedule of the material sheet A1 can be put into effect using the material sheet Sn+1.

With this arrangement, the automatic operation can be continued without stopping the sheet metal factory processing installation 30 including the processing machine 36.

FIG. 10 shows a third example of the interrupt function of the sheet metal factory processing system 1. This example shows that when the interrupt processing schedule is generated within m minutes of the processing completion slot time of the n-th material sheet Sn (material & thickness M1), the material sheet A1 to be used in the interrupt processing schedule has material•thickness M2 which is different from the n+1-th material sheet Sn+1 (material & thickness M1).

In this case, the processing schedule (product) Sn is directly unloaded from the processing machine 36 to the unloading buffer 44, the material sheet Sn+1 is allowed to be on standby in the loading/unloading shuttle 45, the material sheet A1 is directly loaded from the loading buffer 43 to the processing machine 36 and with this arrangement, the interrupt processing schedule of the material sheet A1 can be put into effect.

When there exist a plurality of material sheets A1, they are processed in the order and when all of the interrupt processing schedules are completed, the material sheet Sn+1 which is on standby in the loading/unloading shuttle 45 is loaded to the processing machine 36, and the processing is carried out.

With this arrangement, the automatic operation can be continued without stopping the sheet metal factory processing installation 30 including the processing machine 36.

FIG. 11 shows a fourth example of the interrupt function of the sheet metal factory processing system 1. This example shows that when the n-th material sheet Sn (material & thickness M1) is loaded on the processing machine 36 and the system is waiting for the start of the processing, express or rush interrupt processing schedule A1 that can use the material sheet Sn (material & thickness M1) is generated.

In this case, if the express interrupt processing schedule data is dynamically nested in the material sheet Sn, the express interrupt processing schedule A1 can be put into effect using the material sheet Sn.

With this arrangement, the automatic operation can be continued without stopping the sheet metal factory processing installation 30 including the processing machine 36.

FIG. 12 shows a fifth example of the interrupt function of the sheet metal factory processing system 1. This example shows that a compulsory interrupt processing schedule A1 that can be reserved (material & thickness M1) is generated in a remaining area of the material sheet Sn during processing of the n-th material sheet Sn (material & thickness M1).

In this case, if the compulsory interrupt processing schedule data is dynamically nested in the remaining area of the material sheet Sn, the compulsory interrupt processing schedule A1 can be put into effect using the remaining area of the material sheet Sn.

With this arrangement, the automatic operation can be continued without stopping the sheet metal factory processing installation 30 including the processing machine 36.

FIG. 13 shows a sixth example of the interrupt function of the sheet metal factory processing system 1. This example shows that a compulsory interrupt processing schedule A1 that can be reserved (material & thickness M1) is generated in an unprocessed part area of the material sheet Sn during the processing of the n-th material sheet Sn (material & thickness M1).

In this case, if the compulsory interrupt processing schedule data is dynamically nested in the unprocessed part area of the material sheet Sn, the compulsory interrupt processing schedule A1 can be put into effect using the unprocessed part area of the material sheet Sn.

With this arrangement, the automatic operation can be continued without stopping the sheet metal factory processing installation 30 including the processing machine 36.

FIG. 14 is a schematic block diagram of a second embodiment of a sheet metal factory processing system according to the present invention. In this sheet metal factory processing system 101, a production management apparatus 110 and a plurality of sheet metal factory processing installation 130 (#1 to #n) are connected to a network 120.

A structure of the production management apparatus 110 and structures of the sheet metal factory processing installation 130 are the same as those of the sheet metal factory processing system 1 shown in FIG. 1, the same elements are designated with numbers used in FIG. 1 to which 100 is added, and detailed explanation thereof will be omitted.

Each of the sheet metal factory processing installation 130 (#1 to #n) is independent from one another. That is, the facilities 130 are independently carry out communications with the production management apparatus 110, request schedules from a controller 131, receive processing schedules from the production management apparatus 110, and carry out the processing in accordance with the processing schedule.

The production management apparatus 110 can carry out communications with all of the sheet metal factory processing installation 130 (#1 to #n), and transfer the processing schedules individually to the schedule requests from the sheet metal factory processing installation 130, and put the processing schedules into effect.

Since the production management apparatus 110 is connected to the plurality of sheet metal factory processing installation 130 (#1 to #n), if processing failure is generated in one of the sheet metal factory processing installation 130 (#α), the processing schedule which should be put into effect by this sheet metal factory processing installation 130 (#α) can be put into effect of another sheet metal factory processing installation 130 (#β).

With this arrangement, halt (waiting) time can be reduced as the entire system, and availability ratio and productivity can be improved.

Furthermore, the production management apparatus 110 can produce a production designation to handle two or more sheet metal factory processing installation 130, 130, . . . as a group based on the production control. It is possible to produce a processing schedule for reserving the processing schedules for the sheet metal factory processing installation 130, 130, . . . based on this production designation.

The processing schedules reserved for the sheet metal factory processing installation 130, 130, . . . are optically formed in accordance with schedule progress of each of the sheet metal factory processing installation 130 in the group so that the halt (waiting) time is reduced as group unit, and availability ratio and productivity are improved.

FIG. 15 is a schematic block diagram showing a third embodiment of the sheet metal factory processing system according to the invention. In this sheet metal factory processing system 201, two sheet metal factory processing installation 230 (#1 and #2) commonly use a controller 231, a line control box 237 and a peripheral device 240, and the common controller 231 is connected to a production management apparatus 210 through a network 220.

A structure of the production management apparatus 210 and structures of the sheet metal factory processing installation 230 are substantially the same as those of the sheet metal factory processing system 1 shown in FIG. 1, the same elements are designated with numbers used in FIG. 1 to which 200 is added, and detailed explanation thereof will be omitted. Only the peripheral device 240 will be explained with reference to FIG. 16.

FIG. 16 is a schematic block diagram showing a layout example of the peripheral device 240 in the sheet metal factory processing system 201. The peripheral device 240 comprises a material storage 241, a product storage 242, a loading buffer 243, an unloading buffer 244, two loading/unloading shuttles 245 (#1 and #2) and a single-sheet pickup and conveying device 246 which are disposed around the two processing machines 236 (#1 and #2).

In this sheet metal factory processing system 201, the two sheet metal factory processing installation 230 (#1 and #2) are formed as one unit from the beginning. Thus, the two sheet metal factory processing installation 230 (#1 and #2) handle the processing schedule as a sheet metal factory processing installation units 230 (#1 and #2), and the schedule can be optimally formed in detail.

With this arrangement, halt (waiting) time as the unit can be reduced, the availability ratio can be improved, halt (waiting) time as the entire system can be reduced, and the availability ratio and productivity can be improved.

FIG. 17 is a schematic block diagram showing a fourth embodiment of the sheet metal factory processing system according to the invention. In this sheet metal factory processing system 301, a production management apparatus 310, a plurality of sheet metal factory processing installation 330 (#1 to #n) and an automatic warehouse installation 350 are connected to a network 320.

A structure of the production management apparatus 310 and structures of the sheet metal factory processing installation 330 are the same as those of the sheet metal factory processing system 1 shown in FIG. 1, like elements are designated with numbers used in FIG. 1 to which 300 is added, and detailed explanation thereof will be omitted.

The automatic warehouse installation 350 includes an automatic warehouse controller 351, an automatic warehouse control board 352 and a material/product automatic warehouse/storage 353. The automatic warehouse controller 351 of the automatic warehouse installation 350 is connected to the network 320.

The automatic warehouse controller 351 sends and receives various data to and from a job controller 314 of the production management apparatus 310 through the network 320, and sends and receives necessary various data to and from various portions of the automatic warehouse installation 350.

The automatic warehouse control board 352 is connected to a line control box 337 of the plurality of sheet metal factory processing installation 330 (#1 to #n), and controls entering and dispatching of the material/product in cooperation with peripheral devices 340 thereof.

As shown in FIG. 18, the material/product automatic warehouse/storage 353 is combined with a processing machine cell 336 including the peripheral device 340 of the sheet metal factory processing installation 330 (#1 to #n). The material/product automatic warehouse/storage 353 brings out necessary material sheet from the warehouse and supplies the same to the processing machine cells 336 (#1 to #n), and receives processed sheet (product) and entering the same into the warehouse.

Like the sheet metal factory processing system 101 shown in FIG. 14, the sheet metal factory processing system 301 optimally forms the processing schedules of the plurality of sheet metal factory processing installation 330 (#1 to #n), halt (waiting) time of the entire system is reduced, and the availability ratio and productivity can be improved.

BRIEF DESCRIPTION OF THE DRAWINGS

FIG. 4 is a Table showing one example of a processing schedule based on the production designation.

FIG. 5 is a Table showing reserved actual results of processing schedule.

FIG. 6 is a Table showing one example of an added production designation.

FIG. 7 is a Table showing one example of the processing schedule based on the added production designation.

FIG. 8 is a schematic layout block diagram showing a first example of an interrupt function of the sheet metal factory processing system.

FIG. 9 is a schematic layout block diagram showing a second example of the interrupt function of the sheet metal factory processing system.

FIG. 13 is a schematic layout block diagram showing a sixth example of the interrupt function of the sheet metal factory processing system.

FIG. 18 is a schematic block diagram showing a layout example of automatic warehouse installation and sheet metal factory processing installation.

Figure 1:
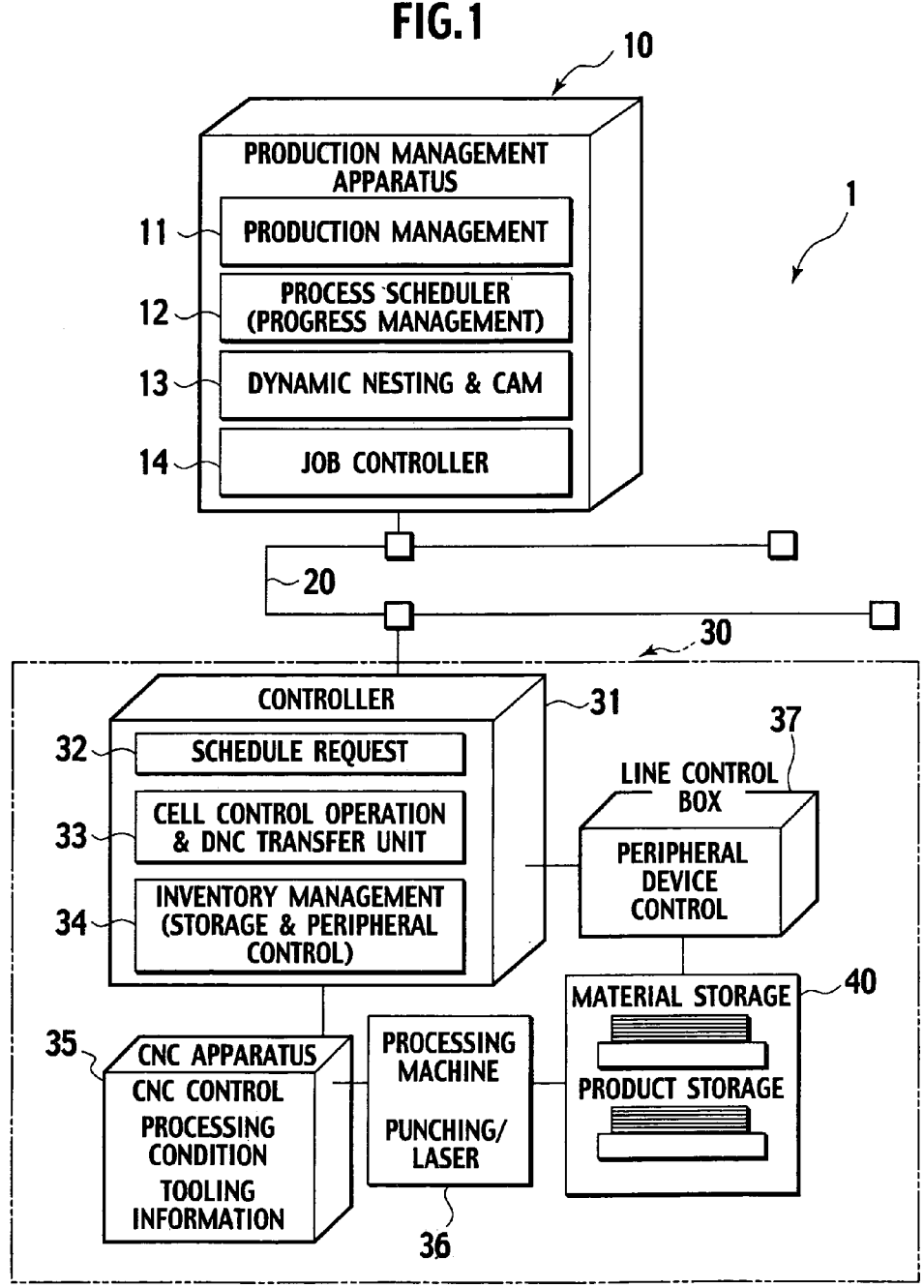
FIG. 1 is a schematic block diagram showing a first embodiment of a sheet metal factory processing system according to the present invention.
Figures 2, 3:
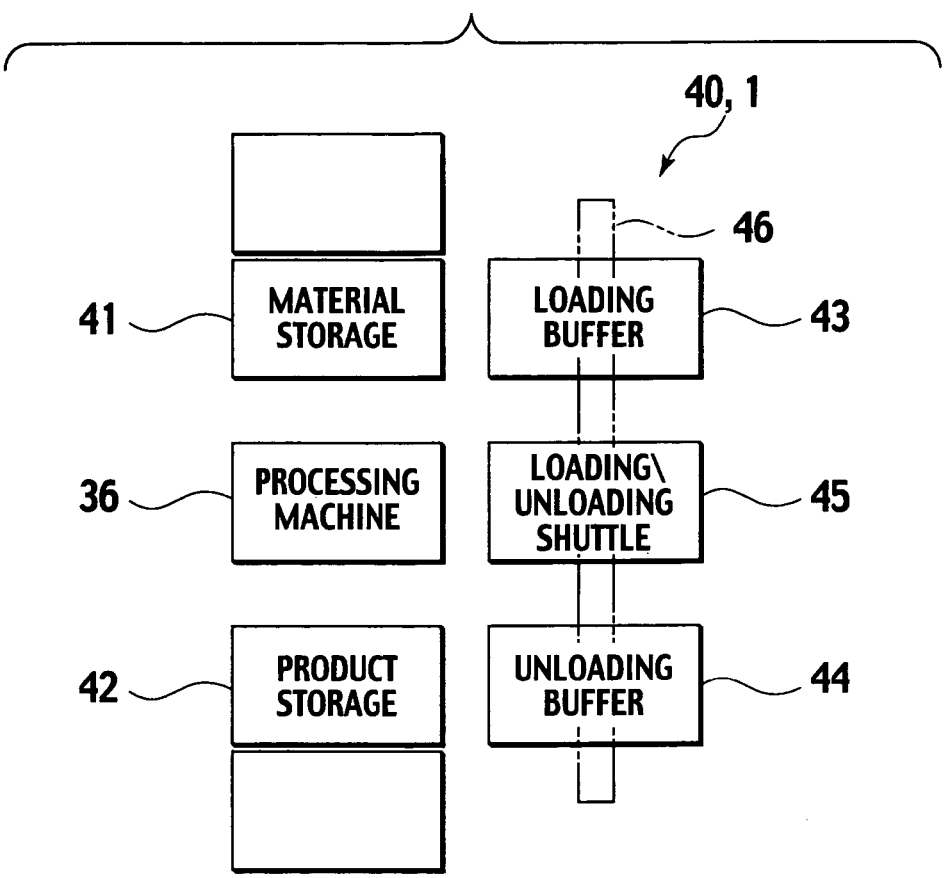
FIG. 2 is a schematic block diagram showing a layout example of the peripheral device of the sheet metal factory processing system.
FIG. 3 is a Table showing one example of a production designation.
Figure 11:
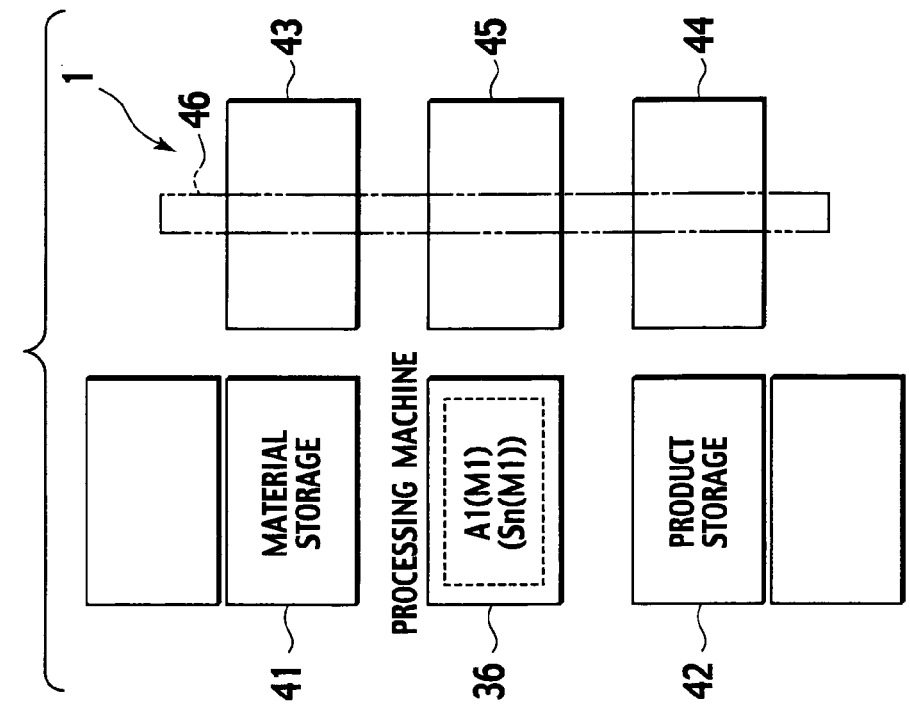
FIG. 11 is a schematic layout block diagram showing a fourth example of the interrupt function of the sheet metal factory processing system.
Figure 10:
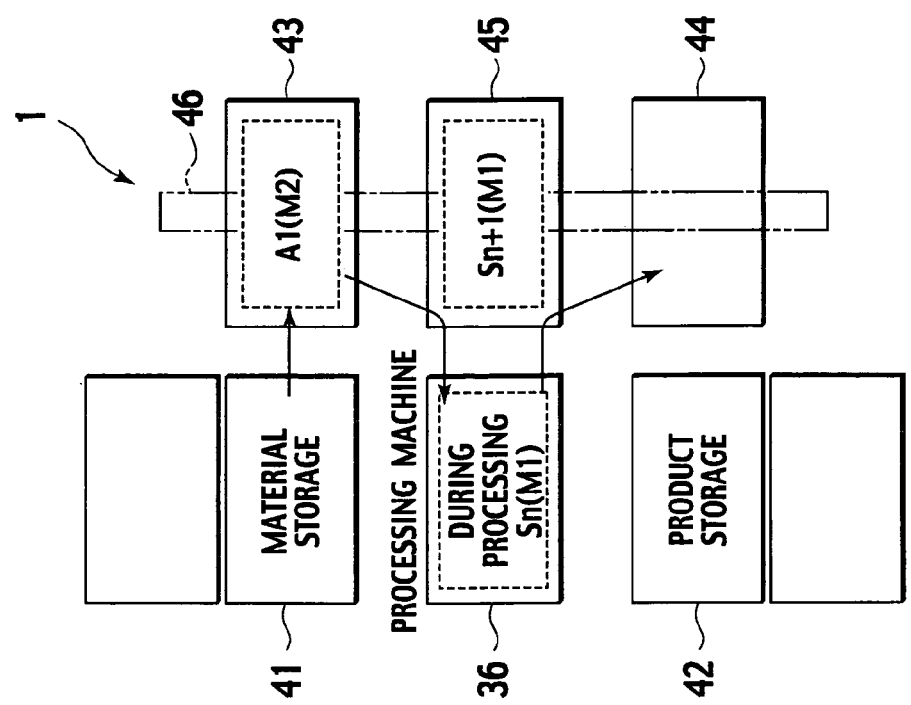
FIG. 10 is a schematic layout block diagram showing a third example of the interrupt function of the sheet metal factory processing system.
Figure 12A:
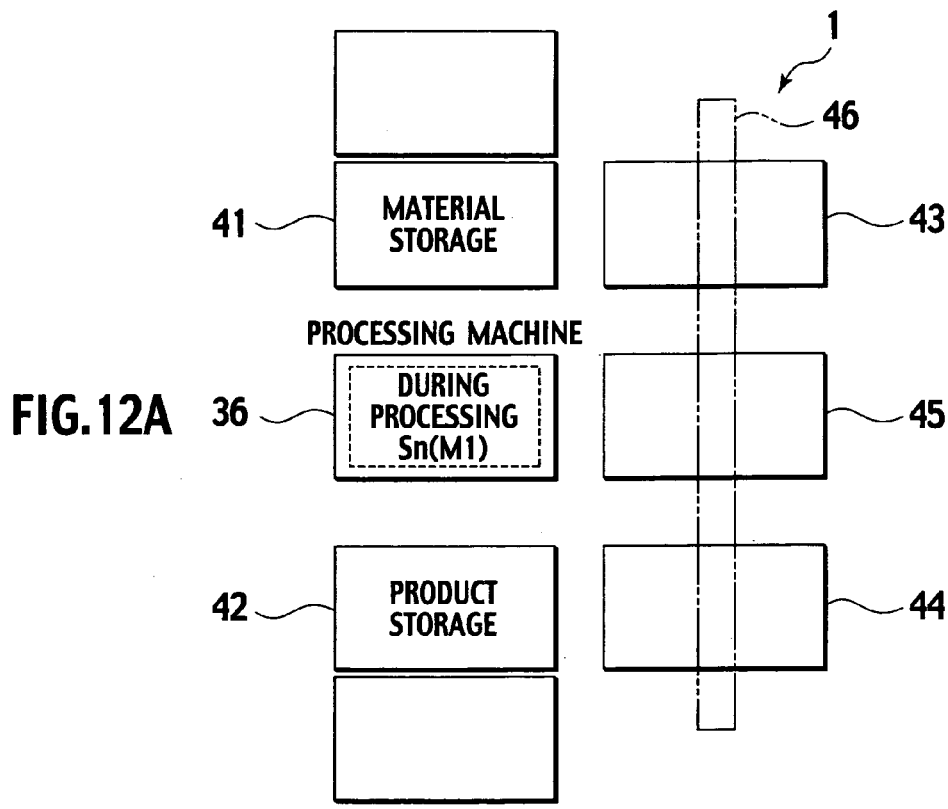
FIG. 12 is a schematic layout block diagram showing a fifth example of the interrupt function of the sheet metal factory processing system.
Figure 12B:
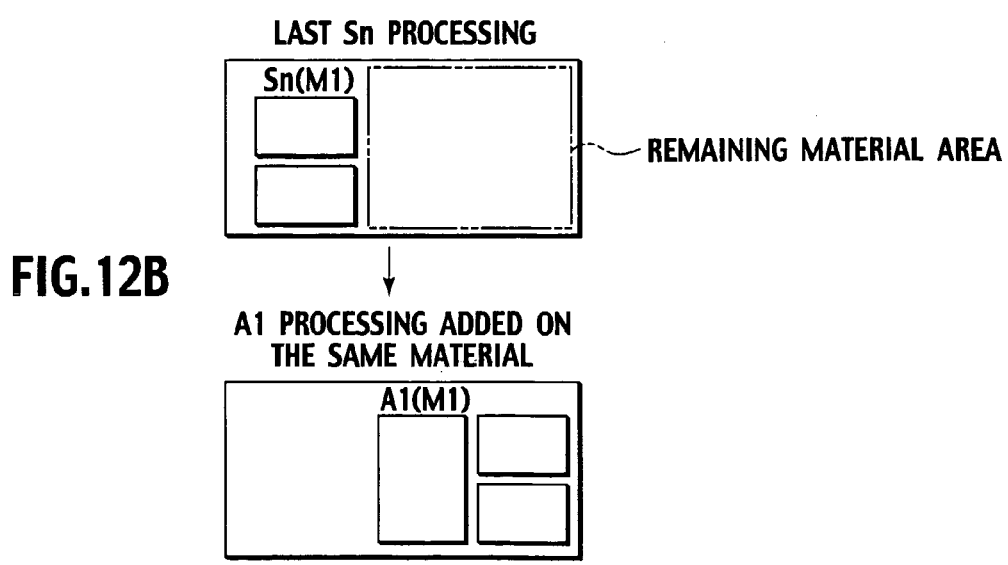
Figure 14:
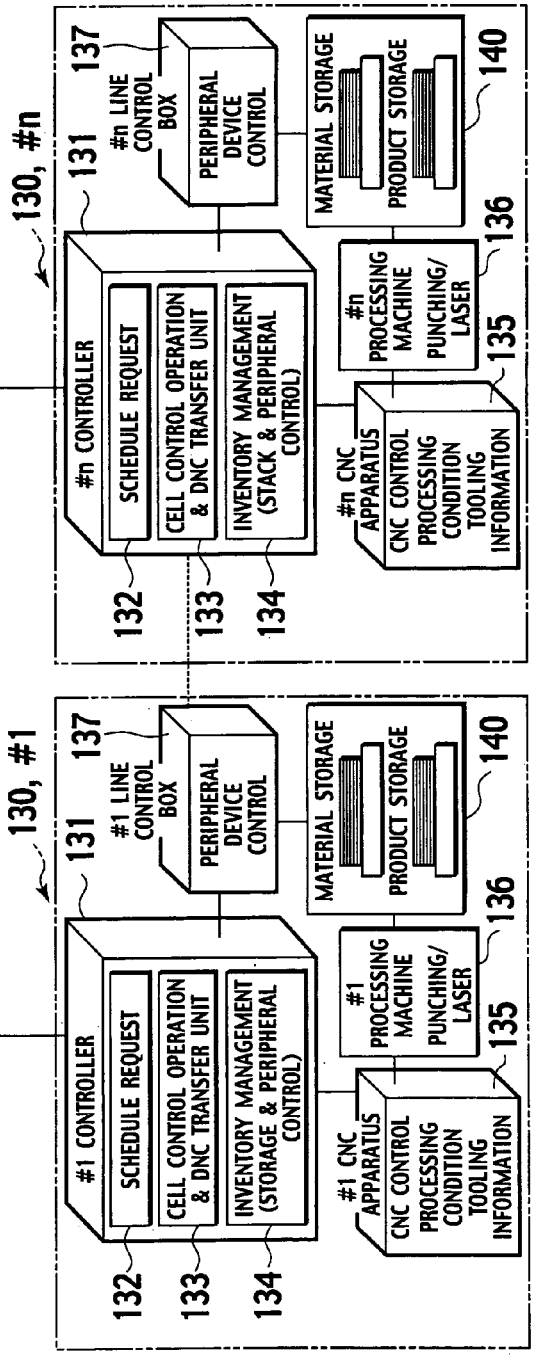
FIG. 14 is a schematic block diagram showing a second embodiment of the sheet metal factory processing system according to the invention.
Figure 15:
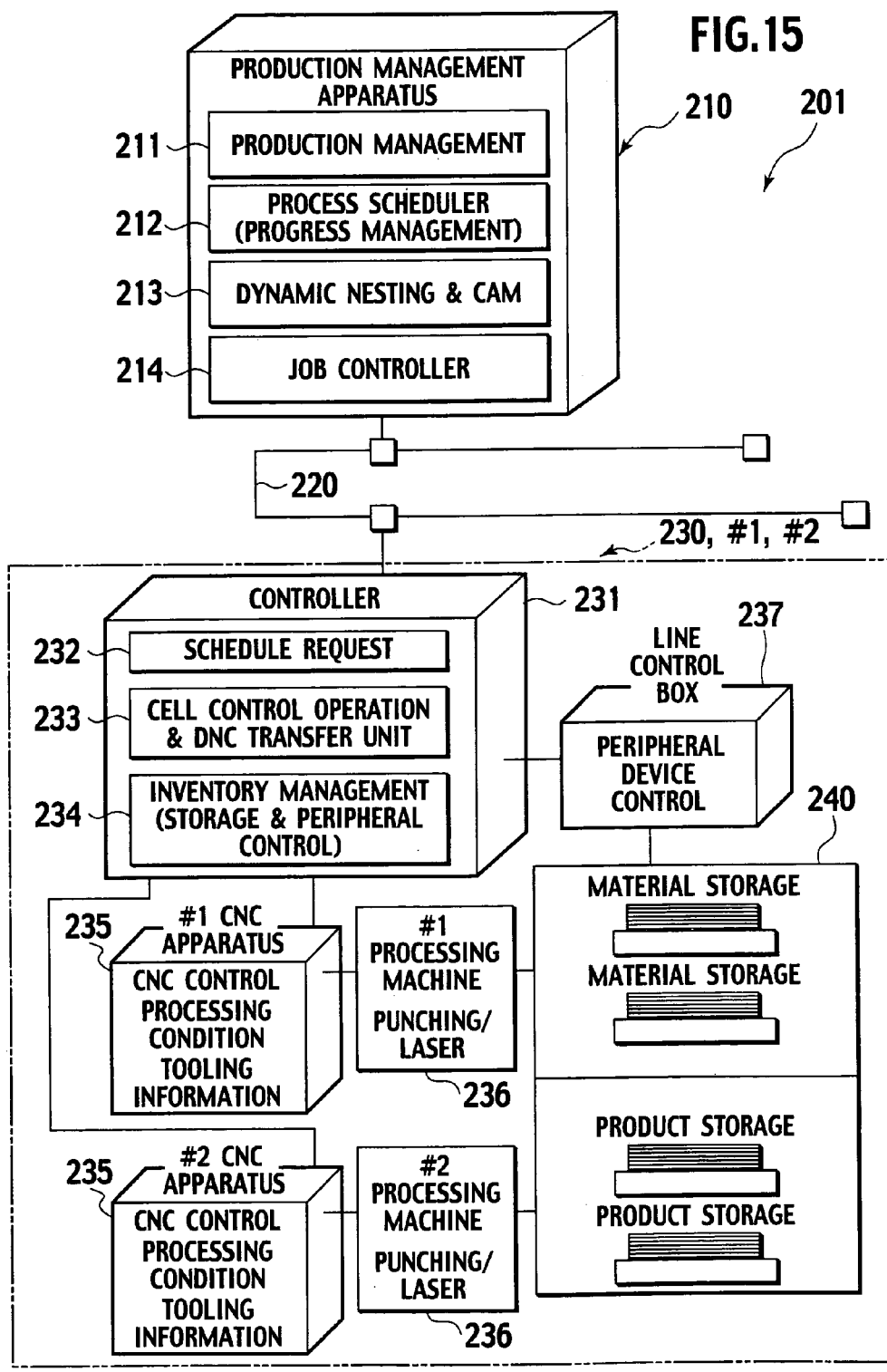
FIG. 15 is a schematic block diagram showing a third embodiment of the sheet metal factory processing system according to the invention.
Figure 16:
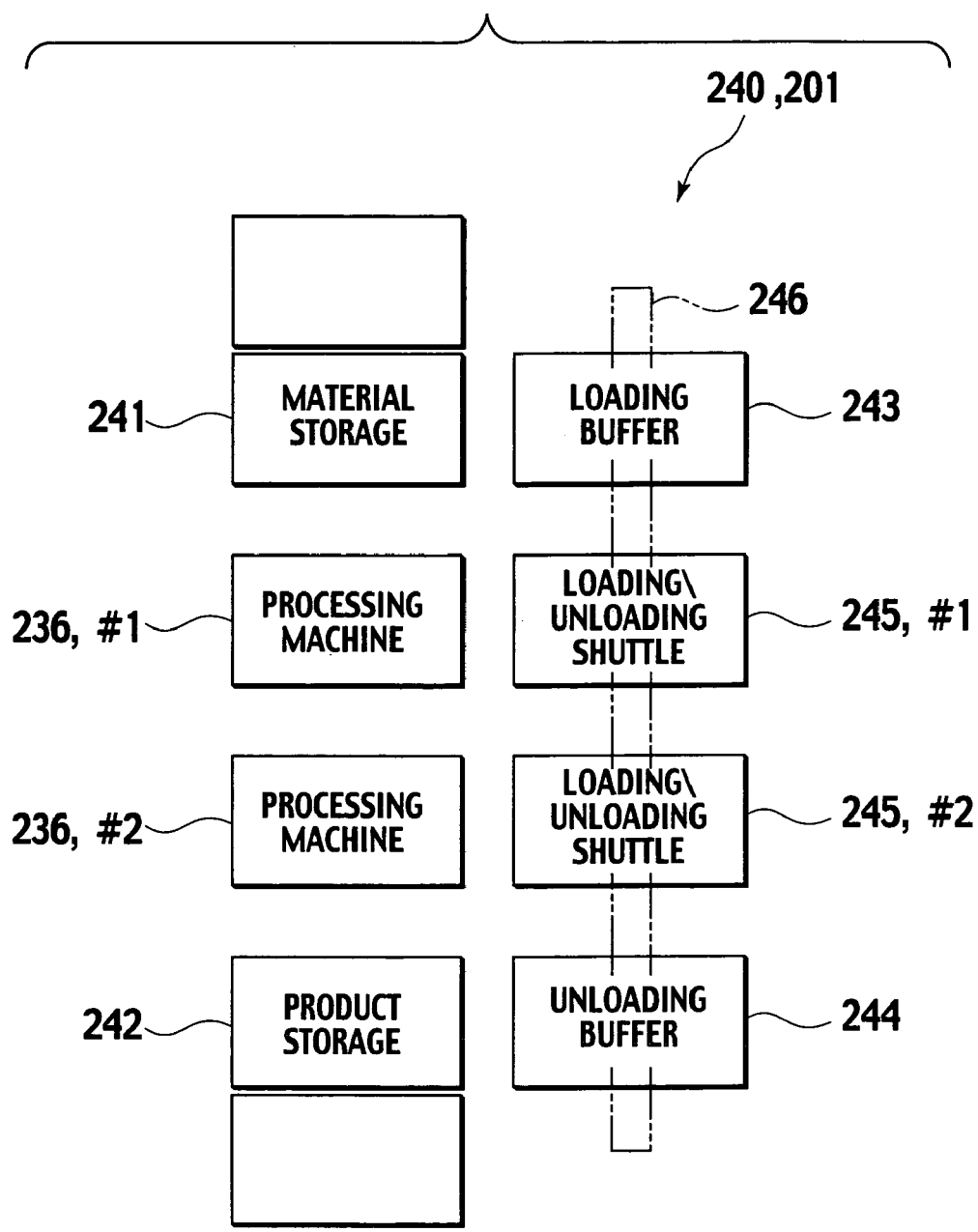
FIG. 16 is a schematic block diagram showing a layout example of the peripheral device of the sheet metal factory processing system.
Figure 17:
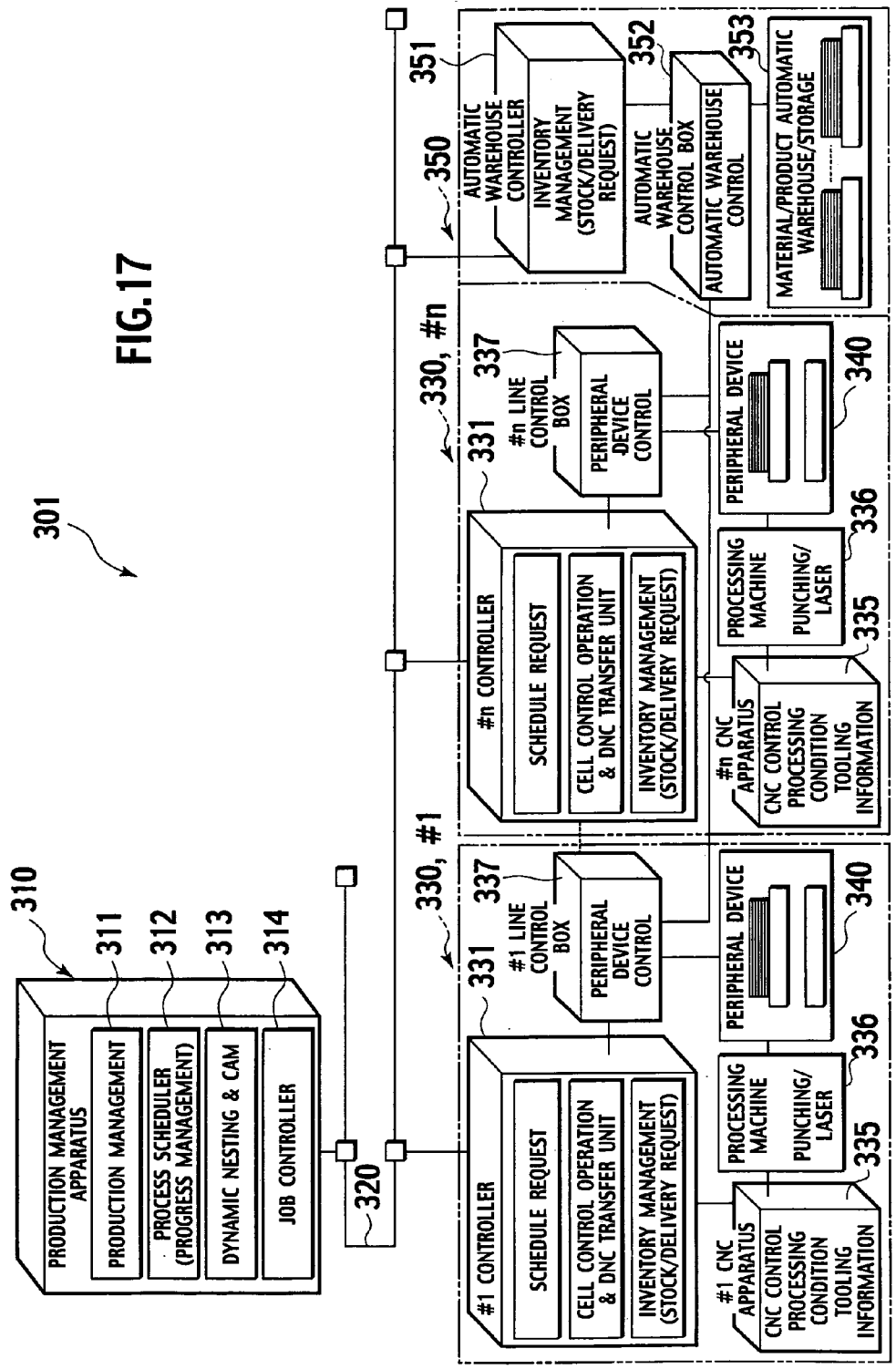
FIG. 17 is a schematic block diagram showing a fourth embodiment of the sheet metal factory processing system according to the invention.

DESCRIPTION OF REFERENCE NUMERALS 1, 101, 201, 301 Sheet metal factory processing system
10, 110, 210, 310 Production management apparatus
11, 111, 211, 311 Production management unit
12, 112, 212, 312 Process scheduler (progress management)
13, 113, 213, 313 Dynamic nesting & CAM processing unit
14, 114, 214, 314 Job controller
20, 120, 220, 320 Network
30, 130, 230, 330 Sheet metal factory processing installation
310, 131, 231, 331 Controller
32, 132, 232 Schedule request (dynamic nesting processing request) unit
33, 133, 233 Cell control operation/DNC transfer unit
34, 134, 234 Inventory management (storage & periphery control) unit
35, 135, 235, 335 CNC apparatus
36, 136, 236, 336 Processing machine
37, 137, 237, 337 Line control box
40, 140, 240, 340 Peripheral device
41, 241 Material storage
42, 242 Product storage
43, 243 Loading buffer
44, 244 Unloading buffer
45, 245 Loading/unloading shuttle
46, 246 Single-sheet pickup and conveying device
350 Automatic warehouse installation
351 Automatic warehouse controller
352 Automatic warehouse control board
353 Material/product automatic warehouse/storage

What is claimed is:

1. A sheet metal factory processing system, comprising:
a production manager which generates a processing schedule based on a manufacturing designation to manage the processing schedule in each unit of at least one unit of material sheets, the processing schedule being generated by nesting and generating sheet processing data; and
a sheet metal factory processing installation which is connected to the production manager through a communication network, and which receives the processing schedule from the production manager and executes the received processing schedule
wherein, in response to a processing schedule request from the sheet metal factory processing installation, the production manager transmits the processing schedule for a next material sheet to the sheet metal factory processing installation at a synchronized timing when processing of a preceding material sheet is estimated to end and convey-in preparation of the next material sheet is estimated to be complete.

2. The sheet metal factory processing system of claim 1, wherein, when a selected change is made to the manufacturing designation, the production manager integrates an unexecuted processing schedule included in the manufacturing designation with the content of the selected change to regenerate a processing schedule based on the sheet processing data obtained by nesting according to a new manufacturing designation.

3. A sheet metal factory processing system comprising:
a production manager which generates a processing schedule based on a manufacturing designation to manage the processing schedule in each unit of at least one unit of material sheets, the processing schedule being generated by nesting and generating sheet processing data; and
a plurality of sheet metal factory processing installations which are connected to the production manager through a communication network, and which receive the processing schedule from the production manager and independently execute the received processing schedules,
wherein, in response to a processing schedule request from one of the plurality of sheet metal factory processing installations, the production manager transmits the processing schedule of a next material sheet to the corresponding sheet metal factory processing installation at a synchronized timing when processing of a preceding material sheet in the corresponding sheet metal factory processing installation is estimated to end and convey-in preparation of the next material sheet is estimated to be complete.

4. The sheet metal factory processing system of claim 3, wherein, when a selected change is made to the manufacturing designation, the production manager integrates an unexecuted processing schedule included in the manufacturing designation with the content of the selected change to regenerate a processing schedule based on the sheet processing data obtained by nesting according to a new manufacturing designation.

5. A processing schedule management method, comprising:
generating a processing schedule based on a manufacturing designation to manage the processing schedule in each unit of at least one unit of material sheets, the processing schedule being generated by nesting and generating sheet processing data; and providing the generated processing schedule to a sheet metal factory processing installation, wherein, in order to synchronize a convey-out operation of a product included in a processing schedule which is being executed in an sheet metal factory processing installation with a convey-in operation of a material used in a next processing schedule, the next processing schedule is started.

6. A processing schedule management method, comprising:

generating a processing schedule based on a manufacturing designation to manage the processing schedule in each unit of at least one unit of material sheets, the processing schedule being generated by nesting and generating sheet processing data; and providing the generated processing schedule to a sheet metal factory processing installation, wherein, when a material sheet used in a processing schedule based on a previous manufacturing designation has not been processed, the processing schedule based on the previous manufacturing designation is canceled based on an addition to the manufacturing designation, and the added part is allocated to the material sheet to execute processing.

7. A processing schedule management method, comprising:

generating a processing schedule based on a manufacturing designation to manage the processing schedule in each unit of at least one unit of material sheets, the processing schedule being generated by nesting and generating sheet processing data; and providing the generated processing schedule to a sheet metal factory processing installation, wherein, when a material sheet used in a processing schedule based on a previous manufacturing designation is being processed, processing of an unprocessed part of a plurality of parts arranged on the material sheet is canceled based on an addition to the manufacturing designation, and the added part is allocated to an unused region including an arrangement position of the unprocessed part on the material sheet to execute processing.

8. A processing schedule management method, comprising:

generating a processing schedule based on a manufacturing designation to manage the processing schedule in each unit of at least one unit of material sheets, the processing schedule being generated by nesting and generating sheet processing data; and providing the generated processing schedule to a sheet metal factory processing installation, wherein, when a material sheet used in a processing schedule based on a previous manufacturing designation has been processed in a sheet metal factory processing installation, based on an addition to the manufacturing designation, the added part is allocated to the rest of the blank region of the material sheet on which the part is processed to execute processing.

* * * * *